United States Patent
Baldischweiler

(10) Patent No.: US 6,934,887 B1
(45) Date of Patent: Aug. 23, 2005

(54) METHOD FOR PROTECTING A PROGRAM FLOW

(75) Inventor: Michael Baldischweiler, Munich (DE)

(73) Assignee: Giesecke & Devrient GmbH, Munich (DE)

(*) Notice: Subject to any disclaimer, the term of this patent is extended or adjusted under 35 U.S.C. 154(b) by 399 days.

(21) Appl. No.: 10/070,444

(22) PCT Filed: Sep. 18, 2000

(86) PCT No.: PCT/EP00/09131
§ 371 (c)(1),
(2), (4) Date: Jun. 20, 2002

(87) PCT Pub. No.: WO01/22223
PCT Pub. Date: Mar. 29, 2001

(30) Foreign Application Priority Data
Sep. 20, 1999 (DE) .......................... 199 44 991

(51) Int. Cl.[7] ............................................ G06F 11/00
(52) U.S. Cl. .......................................... 714/38; 714/52
(58) Field of Search .................................. 714/38, 52

(56) References Cited

U.S. PATENT DOCUMENTS

| | | |
|---|---|---|
| 5,651,111 A | 7/1997 | McKeeman et al. |
| 5,715,389 A | 2/1998 | Komori et al. |
| 5,761,414 A | 6/1998 | Akaishi et al. |
| 5,768,591 A | 6/1998 | Robinson |
| 5,909,580 A | 6/1999 | Crelier et al. |
| 6,202,176 B1 | 3/2001 | Baldischweiler et al. |
| 6,314,532 B1 * | 11/2001 | Daudelin et al. ............. 714/38 |
| 6,654,954 B1 * | 11/2003 | Hicks .......................... 717/162 |
| 6,766,458 B1 * | 7/2004 | Harris et al. ................ 713/201 |

FOREIGN PATENT DOCUMENTS

DE 3502387 7/1986

OTHER PUBLICATIONS

D. Y. Cheng, J. T. Deutsch and R. W. Dutton, "'Defensive Programming' in the Rapid Development of a Parallel Scientific Program", IEEE Transactions On Computer-Aided Design, vol. 9, No. 6, Jun. 1990, pp. 665–669.

* cited by examiner

Primary Examiner—Bryce P. Bonzo
(74) Attorney, Agent, or Firm—Bacon & Thomas, PLLC

(57) ABSTRACT

The invention relates to a method for protecting the program flow during sub-program calls. Known methods for protecting data contract the evaluation of data by specific interruption of the program, do not however offer any effective protection for modular programs, especially with regard to sub-program calls. According to the invention, the requested program therefor checks the data communicated directly or indirectly by the requesting program before or during the execution of the program.

5 Claims, 2 Drawing Sheets

METHOD FOR PROTECTING A PROGRAM FLOW

BACKGROUND OF THE INVENTION

1. Field of the Invention

The present invention relates to a method for protecting a prorarm at a call of subprograms.

2. Description of Related Art

In particular with security-relevant applications, for example in the area of IC cards, it is necessary to protect the program run from unauthorized manipulation. For protecting secret data, for example secret key data, it is known to store the data to be protected in encrypted form in order to prevent readout by unauthorized persons.

Access to secret data can also be effected, however, by selectively interrupting the program run resulting in errors in the encryption routines from which the secret data can be inferred after repeated selective interruption.

To avoid such attacks it is necessary to reliably recognize errors or disturbances of the program run. German patent DE 37 09 524 C2 discloses a method for checking the memory cell contents of a program memory in a computer. Therein, several check sums are stored which are formed from memory cell contents of different address and data memory areas. The check sums are determined at the onset of and/or during computer operation and compared with the stored check sum. Upon ascertainment of a deviation an error signal is outputted.

The method known from DE 37 09 524 C2 is suitable mainly for checking the correctness of data used in a program. It disregards the fact that manipulation of the program run can be effected also or in particular upon program calls, i.e. upon execution of sub- or function programs.

SUMMARY OF THE INVENTION

It is therefore an objective of the present invention to provide a method allowing a reliable check of modularly constructed programs, in particular upon subprogram calls.

This objective is achieved according to the invention by the called program performing a data check which ascertains reliable transfer of the data to be passed from the calling program.

The invention achieves additional security which guarantees not merely that individual program parts are executed reliably and completely but that the total program run is undisturbed and free from manipulation.

An advantageous embodiment of the invention provides that the calling program first forms a check sum for the parameters passed from the calling program to the called program, said check sum being stored in a specially provided memory area. After the parameters are passed the called program also forms a check sum for the received parameters. If the check sums formed by the calling and called programs are different, the program is terminated.

In this way it can be ensured that a function program, in particular a function program executing security-relevant data, is already examined for manipulation at the onset, so that the start of the called program with faulty parameters can be prevented from the start and no evaluation of the erroneous data is permitted.

The memory area provided for storing the check sum is preferably created in a RAM or register area.

A further or alternative embodiment for forming the check sum for the parameters to be passed results from the check of the return addresses. The return addresses of the calling functions are entered in a table and the called program can check by means of said table whether the return address transmitted by the calling program is present in the table. In case of a faultily reported return address, the program can be interrupted.

A further alternative or additional security check can be effected by starting a timer upon call of a subprogram or function program. Said timer counts the clock cycles necessary for executing the program. The number of clock cycles required for the regular subprogram run is first preset as the limiting value for the timer. The program is terminated if the number of preset clock cycles was exceeded before the end of the subprogram.

The timer value is advantageously also read at certain preset points of the subprogram and compared with likewise preset intermediate values. In this case as well, the program is terminated if the preset intermediate value was exceeded.

BRIEF DESCRIPTION OF THE DRAWINGS

In the following, the invention will be explained in more detail with reference to FIGS. 1 to 3, in which.

DETAILED DESCRIPTION OF THE PREFERRED EMBODIMENTS

Figure 1:
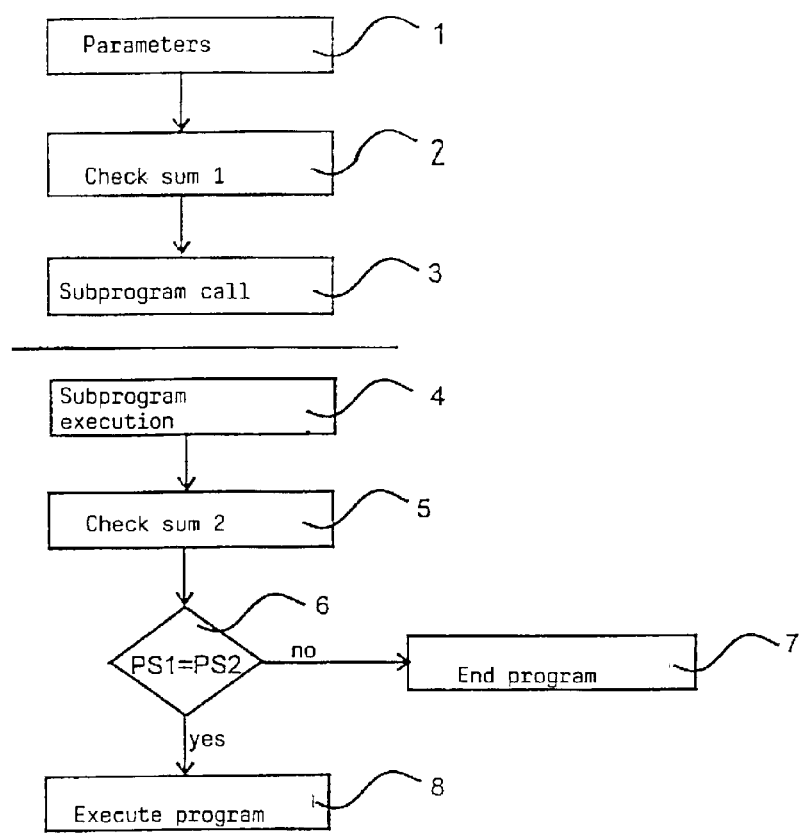
FIG. 1 shows a flowchart for the check by means of check sum.

FIG. 1 describes the run of a subprogram call, in particular a function call, function steps 1 to 3 relating to the program to be called and function steps 4 to 8 relating to the evaluation of the subprogram.

In the program to be called the parameters necessary for executing the subprogram are first provided in step 1. For said parameters a check sum is formed in step 2, consisting in the simplest case of a parity check. Common methods for check sum formation, e.g. CRC (cyclical redundancy check) or EDC, can of course also be employed. The thus determined check sum is written to a specially provided memory area. Said memory area may be a volatile memory (RAM) or a nonvolatile, rewritable memory (e.g. EEPROM).

Subsequent to the formation and storage of check sum 1 the subprogram call takes place in step 3. Step 4 is the onset of execution of the subprogram. In said subprogram, check sum 2 is first formed for the passed parameters. Said check sum is formed by the same method used for determining check sum 1 in the calling program.

Next, a check of check sums PS1 and PS2 for equality is effected in step 6. If it is ascertained in step 6 that the two check sums are unequal, it can be assumed that an error has occurred in the passing of the program parameters, which may be an indication of an intended disturbance aimed at determining secret data. As a measure, the program can be ended in step 7 or corresponding alternative measures are taken, for example an error message to the main program.

If it is ascertained in step 6 that that check sums PS1 and PS2 are equal, the actual function execution is begun.

Figure 2:
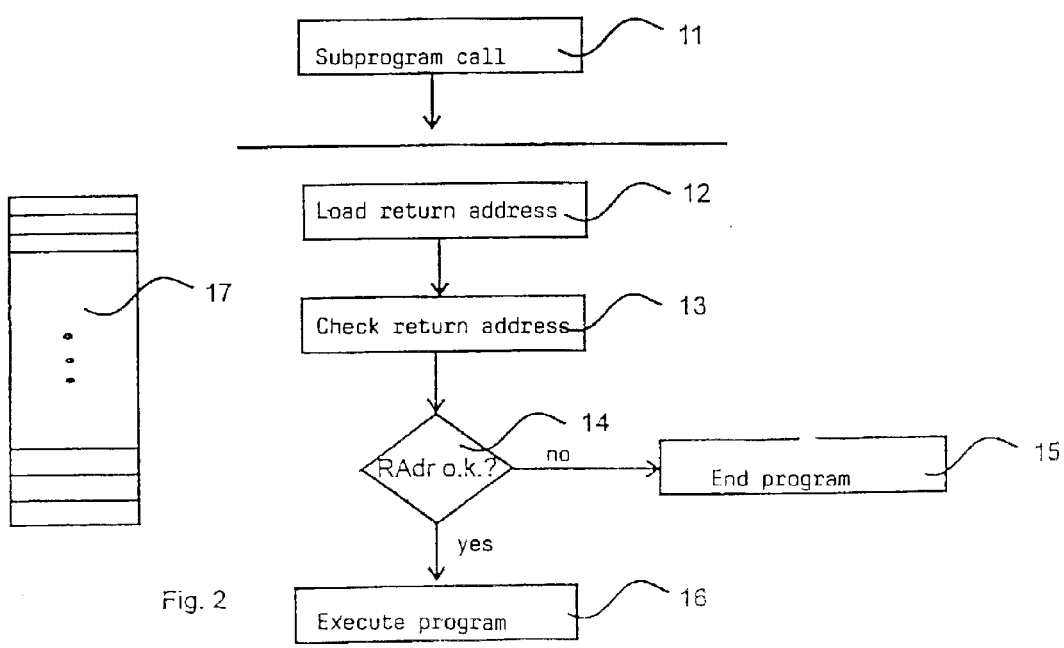
FIG. 2 shows the flow for the check by means of return address table.

FIG. 2 shows a possibility of program protection by checking the return addresses. Return addresses are stacked by hardware at the function call. In the present case the information is thus likewise passed from the calling program (e.g. return addresses) to the subprogram in step 11 at the subprogram call. According to the invention, the return addresses are managed in table 17 and upon execution of the subprogram the return addresses—insofar as they are stored in RAM—are first examined for consistency in step 12, to be checked on the basis of table 17 in step 13. If it was ascertained in step 14 that the passed return address is not present in the table, the program is ended with step 15. Otherwise the execution of the function program is begun in step 16.

Figure 3:
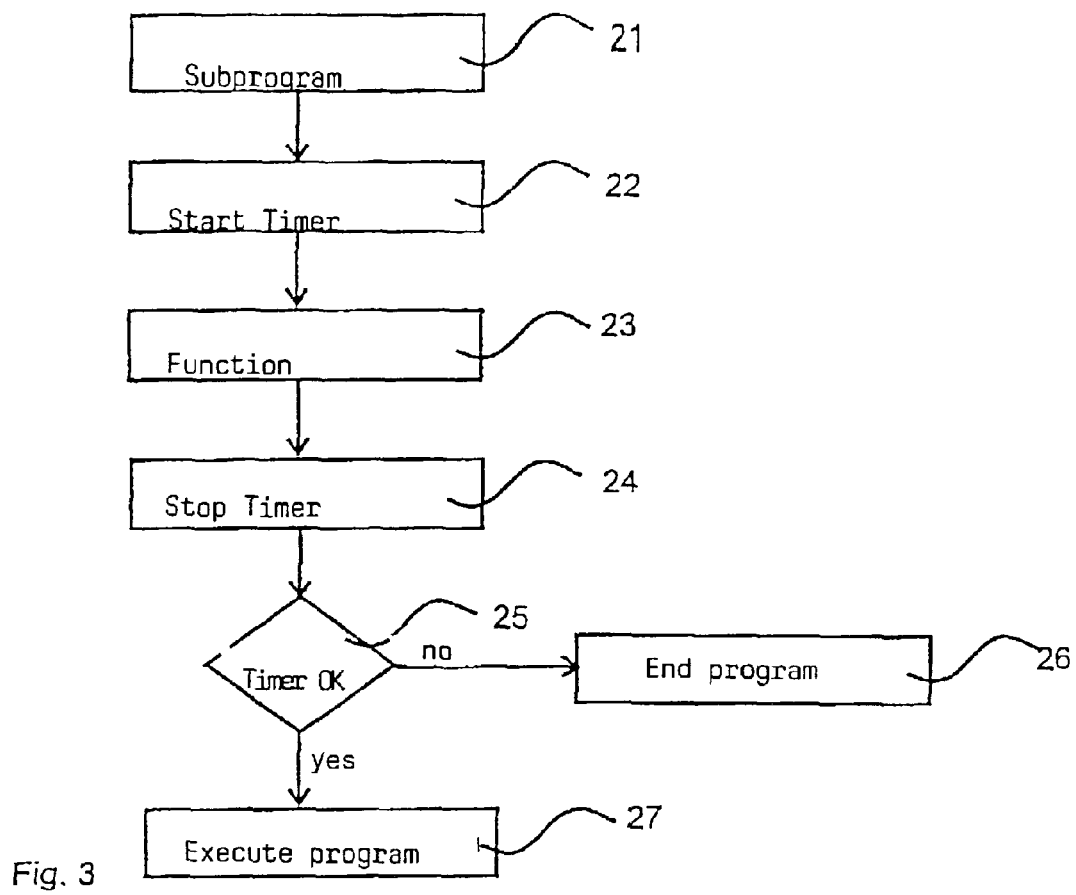
FIG. 3 shows the flow for the check by means of timer.

FIG. 3 shows an embodiment in which the correct program run or the undisturbed program run is checked by means of a timer. Directly after the start of the subprogram in step 21 a timer is started in step 22. Said timer is designed to measure the time or count the clock cycles required for executing the subprogram. Subsequent to the start of the timer in step 22, the function of the subprogram is executed with step 23 and the timer is stopped in step 24 after the end of the function. In step 25 it is checked whether the number of clock cycles required for executing the function program matches the preset number of clock cycles. If there is no match, the program is ended with step 26. Otherwise the program execution is continued in step 27, for example by jumping back to the main program.

FIG. 3 shows that the timer is stopped and checked after the run of the function or function program. In practice, security can be increased by providing certain points in the function program where the timer is additionally checked. This might prevent the function program from being largely executed despite an error or attack.

Alternatively it can also be provided that the timer value is compared continuously with a limiting value after the start and the program terminated if said limiting value has been reached or exceeded.

The individual examples according to FIGS. 1 to 3 have been shown as independent, alternative measures. Security can be increased by combining the examples. The greatest security is obtained by parallel checks by check sum, return address and timer.

What is claimed is:

1. A method for protecting a program run at the call of subprograms, a called program performing, before or during the program execution, a check of data passed directly or indirectly from a calling program, characterized in that the calling program forms a first check sum for parameters to be passed (step 2), said first check sum is stored in a specially provided memory area, the called program forms, before its execution, a second check sum for received parameter (step 5) and checks it for equality with the first check sum (step 6), and in case of inequality of the first and second check sums the program is terminated (step 7) or an error message outputted.

2. A method for protecting a program run at the call of subprograms, a called program performing, before or during the program execution, a check of data passed directly or indirectly from a calling program, characterized in that upon call of a subprogram a timer is started (step 22) which counts a number of clock cycles required for executing the called program and terminates the called program if the preset number of clock cycles was exceeded before termination of the called program (step 26).

3. A method according to claim 1, characterized in that the memory area for storing the check sum is a RAM or register area.

4. A method according to claim 1, characterized in that a return address of a calling function is entered in a table and the called program checks the return address reported by the calling program (step 13) by checking the presence of said return address on the basis of the table.

5. A method according to claim 2, characterized in that a timer value is read at certain preset points (step 24) and compared with a likewise preset intermediate value (step 25) and the called program is terminated if the preset intermediate value was exceeded (step 26).

* * * * *